United States Patent
Yu et al.

(10) Patent No.: US 7,242,838 B2
(45) Date of Patent: Jul. 10, 2007

(54) BACKLIGHT MODULE WITH REFLECTION MEMBER

(75) Inventors: Tai-Cherng Yu, Tu-Cheng (TW); Charles Leu, Fremont, CA (US); Ga-Lane Chen, Fremont, CA (US)

(73) Assignee: Hon Hai Precision Industry Co., Ltd., Tu-cheng, Taipei Hsien (TW)

( * ) Notice: Subject to any disclaimer, the term of this patent is extended or adjusted under 35 U.S.C. 154(b) by 176 days.

(21) Appl. No.: 10/990,845

(22) Filed: Nov. 17, 2004

(65) Prior Publication Data

US 2005/0135746 A1 Jun. 23, 2005

(30) Foreign Application Priority Data

Dec. 19, 2003 (CN) .................. 2003 1 0117571

(51) Int. Cl.
*G02B 6/10* (2006.01)
(52) U.S. Cl. ..................... 385/129; 385/130
(58) Field of Classification Search ............... 385/129
See application file for complete search history.

(56) References Cited

U.S. PATENT DOCUMENTS

| 5,703,667 A | 12/1997 | Ochiai ...................... 349/65 |
| 6,250,767 B1 | 6/2001 | Kusafuka et al. ............. 362/31 |
| 6,612,710 B2 | 9/2003 | Suzuki et al. ................. 362/31 |
| 2002/0131001 A1* | 9/2002 | Raaijmakers et al. ....... 349/139 |

FOREIGN PATENT DOCUMENTS

| CN | 00129293.5 | 4/2001 |
| JP | P2002-208306 | 7/2002 |
| TW | 482931 | 4/2002 |
| TW | M243670 | 9/2004 |

* cited by examiner

*Primary Examiner*—Frank G. Font
*Assistant Examiner*—Mary El-Shammaa
(74) *Attorney, Agent, or Firm*—Morris Manning & Martin LLP; Tim Tingkang Xia, Esq.

(57) ABSTRACT

A backlight module (20) includes a light guide plate (22), a light source (21), and a reflection plate (23). The light guide plate includes a light incidence surface (221) for receiving light, a light emitting surface (223) for emitting light, and a bottom surface (222). The light source is disposed adjacent the light incidence surface. The reflection plate disposed under the bottom surface includes a base (232), and a reflection layer (233) formed on the base. The reflection layer defines a number of diffraction grating units (231) at an outer surface thereof. Grating constants of the diffraction grating units progressively decrease with increasing distance away from the light incidence surface. This enables the light emitting surface to output highly uniform light. Further, if the process of fabrication of the diffraction grating units fails, only the reflection plate need be discarded. Thus the backlight module has a low mass manufacturing cost.

20 Claims, 2 Drawing Sheets

BACKLIGHT MODULE WITH REFLECTION MEMBER

BACKGROUND OF THE INVENTION

1. Field of the Invention

The present invention relates to backlight modules for liquid crystal displays, and particularly to a backlight module utilizing a reflection plate for controlling light emission.

2. Description of Prior Art

A typical liquid crystal display requires a backlight module in order to be able to provide uniform illumination. The performance of the backlight module greatly depends on a light guide plate employed therein. Means for enhancing the uniformity of light that is output from a light guide plate can be classified into two categories. The first category uses geometrical optics means, such as prisms or micro projections. The second category uses wave optics means, such as diffraction gratings. Light guide plates with multifarious configurations of micro projections and prisms have been developed, and some of these light guide plates can generate quite uniform light beams. However, the uniformity provided by projections is relatively low compared with light guide plates having gratings. This is because the gratings of the latter kind of light guide plate can be precisely configured to correspond to the wavelength band of visible light beams, thereby accurately controlling the uniformity of transmission of the light beams. Nevertheless, there are two main problems associated with gratings. Firstly, a grating is liable to become worn over time. Secondly, a grating generates spectral phenomena.

Referring to FIG. 4, U.S. Pat. No. 5,703,667 issued on Dec. 30, 1997 discloses a backlight module. The backlight module 1 comprises a light guide plate 2 having a light incidence surface 2c, a bottom surface 2b and a light emitting surface 2a. The backlight module 1 further comprises a fluorescent tube 4 disposed adjacent the light incidence surface 2c, a reflection plate 5 disposed under the bottom surface 2b, and a diffusing plate 6 and a prism plate 7 disposed on the light emitting surface 2a in that order from bottom to top.

A plurality of reflective diffraction grating units 3 is provided on the bottom surface 2b. Each diffraction grating unit 3 comprises a grating part parallel with the fluorescent tube 4, and a non-grating part. Because all the grating parts of the diffraction grating units 3 are arranged in a same direction parallel to each other, the diffraction grating units 3 provide strong diffraction of light beams received from the fluorescent tube 4.

The ratio of a grating part width to a non-grating part width in the diffraction grating units 3 becomes progressively larger with increasing distance away from the light incidence surface 2c. Therefore, light beams that are available in large quantities at locations nearer to the light incidence surface 2c undergo weaker diffraction, and light beams that are available only in small quantities at locations more remote from the light incidence surface 2c undergo stronger diffraction. As a result, the light emitting surface 2a provides uniform outgoing light beams.

For precision, the diffraction grating units 3 can be fabricated at the bottom surface 2b of the light guide plate 2 by way of injection molding, laser beam etching, electron beam etching, or another kind of precision process used in the semiconductor field. However, if the process of fabrication of the diffraction grating units 3 fails, the whole light guide plate 2 must be discarded. Further, the cost of the light guide plate 2 is high compared to the cost of other parts of the backlight module 1. Defective light guide plates 2 can significantly increase the cost of mass manufacturing backlight modules 1.

It is desired to provide a backlight module which overcomes the above-described problem.

SUMMARY OF THE INVENTION

An object of the present invention is to provide a backlight module which has a low manufacturing cost and which yields high uniformity of outgoing light.

A backlight module of the present invention comprises a light guide plate, a light source, and a reflection plate. The light guide plate includes a light incidence surface for receiving light, a light emitting surface for emitting light, and a bottom surface opposite to the light emitting surface. The light source is disposed adjacent the light incidence surface. The reflection plate disposed under the bottom surface includes a base, and a reflection layer formed on the base. The reflection layer defines a plurality of diffraction rating units at an outer surface thereof.

Grating constants of the diffraction grating units progressively decrease with increasing distance away from the light incidence surface. This enables the light emitting surface to output highly uniform light.

Furthermore, the diffraction grating units are fabricated in the reflection plate only. If the process of fabrication of the diffraction grating units fails, only the reflection plate need be discarded. The light guide plate remains intact and is not wasted. The cost of the reflection plate is lower than that of the light guide plate. Therefore the cost of mass manufacturing the backlight module is reduced.

Other objects, advantages, and novel features of the present invention will become more apparent from the following detailed description when taken in conjunction with the accompanying drawings, in which:

DETAILED DESCRIPTION OF THE INVENTION

Figure 1:
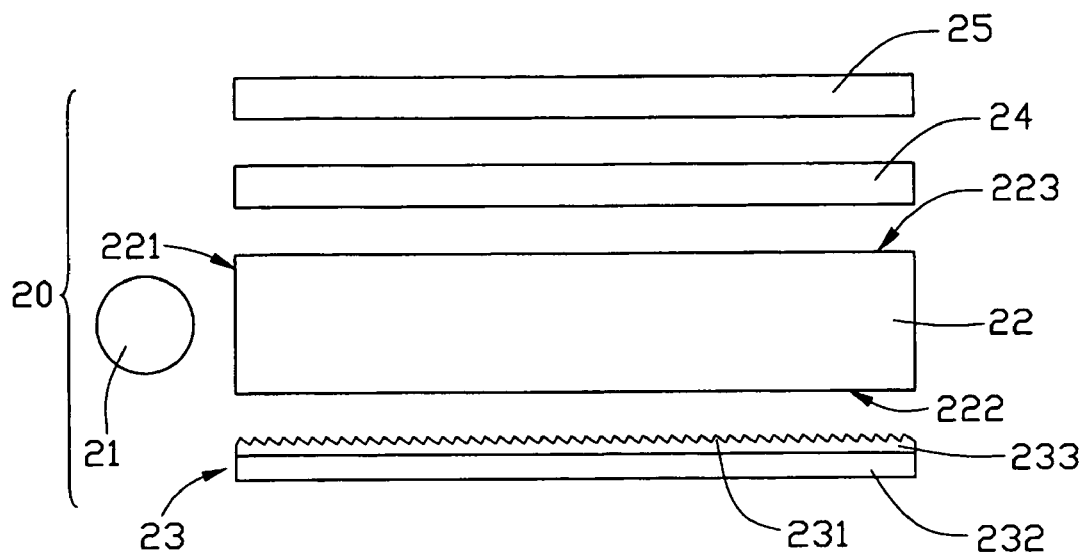
FIG. 1 is an exploded, side elevation of a backlight module according to the present invention, the backlight module comprising a light guide plate, a light source, a reflection plate, a diffusion plate, and a prism plate.

Referring to FIG. 1, a backlight module according to the preferred embodiment of the present invention is shown. The backlight module 20 comprises a linear light source 21, a transparent plate-like light guide member 22 having a rectangular cross-section, a plate-like reflection member 23, a diffusion plate 24, and a prism plate 25.

The light guide plate 22 comprises a light emitting surface 223, a bottom surface 222 opposite to the light emitting surface 223, and a light incidence surface 221 adjoining both the light emitting surface 223 and the bottom surface 222. The light source 21 is a CCFL (cold cathode fluorescent lamp) disposed adjacent the light incidence surface 221. The diffusion plate 24 is positioned adjacent the light emitting surface 223. The prism plate 25 is disposed on the diffusion plate 24.

Figure 2:
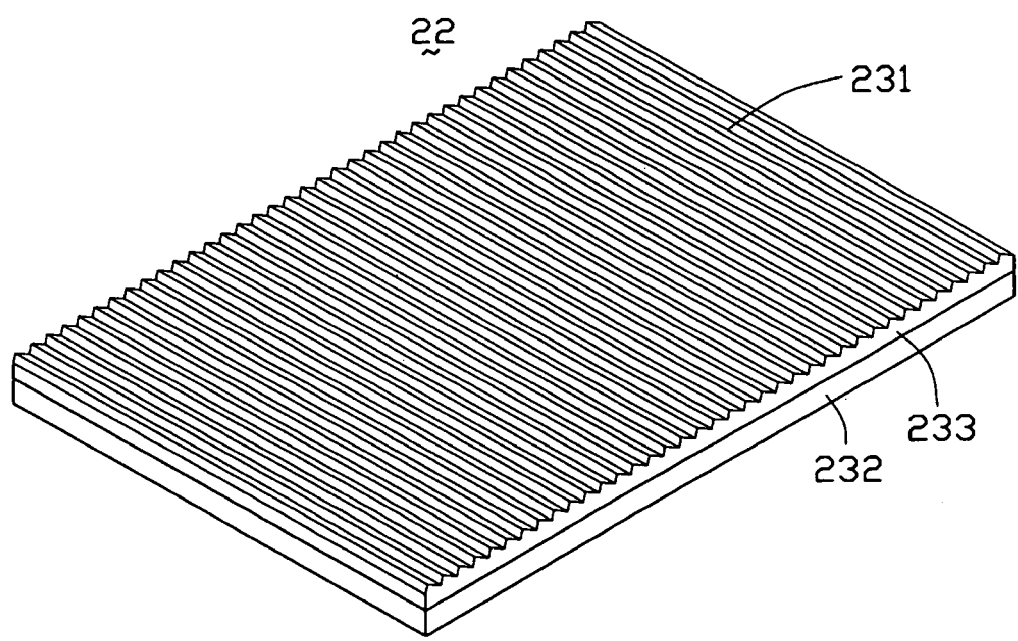
FIG. 2 is an isometric view of the reflection plate of FIG. 1, showing a structure of diffraction grating units therein.

Referring to FIG. 2, the reflection plate 23 disposed under the bottom surface 222 includes a base 232, and a reflection layer 233 formed on the base 232. The reflection layer 233 defines a number of diffraction grating units 231 at an outer surface thereof. Grating constants of the diffraction grating units 231 progressively decrease with increasing distance away from the light incidence surface 21. Grating constants of the diffraction grating units 231 are in the range from 2-10 μm, and preferably 5 μm. Since the CCFL light source 21 mainly emits light beams in a direction perpendicular to the light incidence surface 221, a grating direction of the diffraction grating units 231 is arranged to be parallel with the light incidence surface 221 for diffracting the light beams with maximum efficiency.

Grating constants of the diffraction grating units 231 progressively decrease as a function of increasing distance away from the light incidence surface 21. Accordingly, diffractive capabilities of the diffraction grating units 231 progressively increase with increasing distance away from the light incidence surface 221. Since the intensity of light beams decreases with increasing distance of propagation, the quantity of light beams received by the diffraction grating units 231 decreases with increasing distance away from the light incidence surface 221. The distribution configuration of the diffraction grating units 231 in the reflection layer 233 compensates the light intensity at each diffraction grating unit 231 with a corresponding diffraction capability. Thus, the light guide plate 22 assures uniformity of light beams emitting from the light emitting surface 223.

The base 232 is made of a polyester, and the reflection layer 233 is made of white polyethylene terephthalate. The reflection layer 233 is formed by way of coating a reflection material on the base 232. The diffraction grating units 231 can be formed in the reflection layer 233 by way of injection molding, laser beam etching, electron beam etching, or another suitable kind of precision process used in the semiconductor field.

Figure 3:
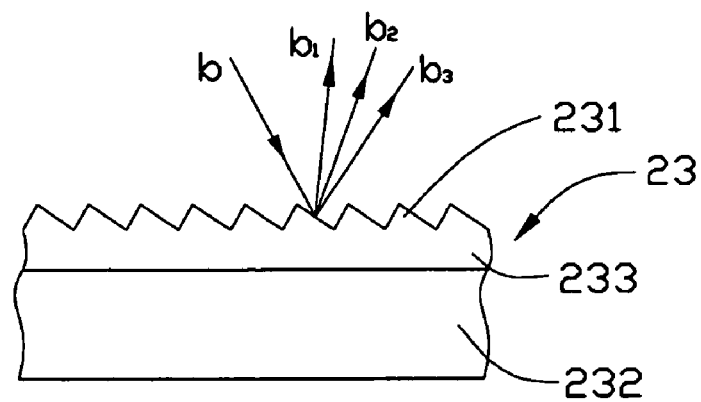
FIG. 3 an enlarged, side elevation of part of the reflection plate of FIG. 1, showing essential optical paths thereof.
Figure 4:
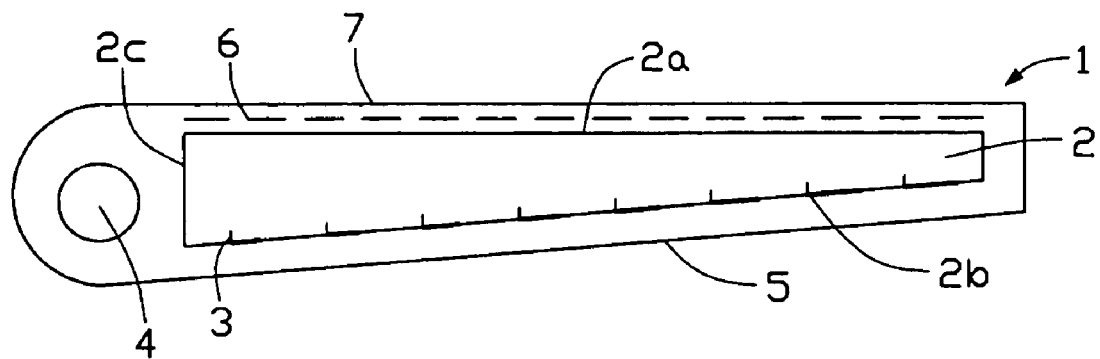
FIG. 4 is a schematic, side elevation of a conventional backlight module.

Referring to FIG. 3, in operation, the light source 21 emits light beams and the light beams are transmitted into the light guide plate 22. Part of the light beams, for example the light beam b, emits from the bottom surface 222 of the light guide plate 22, is diffracted and reflected by the diffraction grating units 231, and is thus divided into light beams b1, b2, b3. The light beams b1, b2, b3 re-enter the light guide plate 22, and exit from the light-emitting surface 223 of the light guide plate 22. The light beams b1, b2, b3, then sequentially pass through the diffusion sheet 24 and the prism sheet 25 to illuminate a liquid crystal panel (not shown).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed. In particular, in other embodiments, the grating constants of the diffraction grating units 231 may be substantially identical with each other.

We claim:

1. A backlight module, comprising:
a light guide plate including:
a light incidence surface for receiving light;
a light emitting surface for emitting light; and
a bottom surface opposite to the light emitting surface;
wherein the light incidence surface is substantially perpendicular to the light emitting surface;
a light source disposed adjacent the light incidence surface; and
a reflection plate disposed under the bottom surface, the reflection plate including:
a base; and
a reflection layer formed on the base for reflecting light;
wherein the reflection layer defines a plurality of diffraction grating units at an outer surface thereof, and the plurality of diffraction grating units face the bottom surface of the light guide plate.

2. The backlight module as claimed in claim 1, wherein diffractive capabilities of the diffraction grating units progressively increase with increasing distance away from the light incidence surface.

3. The backlight module as claimed in claim 2, wherein grating constants of the diffraction grating units progressively decrease with increasing distance away from the light incidence surface.

4. The backlight module as claimed in claim 3, wherein the grating constants of the diffraction grating units are in the range from 2~10 microns.

5. The backlight module as claimed in claim 1, wherein a grating direction of the diffraction grating units is parallel with the light incidence surface.

6. The backlight module as claimed in claim 1, wherein the grating constants of the diffraction grating units are substantially identical to each other.

7. The backlight module as claimed in claim 1, further comprising a diffusion plate positioned adjacent the light emitting surface.

8. The backlight module as claimed in claim 7, further comprising a prism plate disposed on the diffusion plate.

9. The backlight module as claimed in claim 1, wherein the base of the reflection plate is made of polyester.

10. The backlight module as claimed in claim 1, wherein the reflection layer of the reflection plate is made of white polyethylene terephthalate.

11. The backlight module as claimed in claim 1, wherein the reflection layer of the reflection plate is formed by way of coating a reflection material on the base.

12. The backlight module as claimed in claim 1, wherein the diffraction grating units are fabricated by way of etching.

13. The backlight module as claimed in claim 6, wherein the grating constants of the diffraction grating units are 5 microns.

14. A backlight module, comprising:
a light source;
a light guide member disposed next to said light source to receive light emitted from said light source, said light guide member having a light emitting surface for emitting said light therefrom; and
a reflection member used to reflect said light from said light guide member and facing said light guide member, said reflection member defining a plurality of diffraction grating units disposed next to surfaces of said light guide member other than said light emitting surface to diffract said light.

15. The backlight module as claimed in claim 14, wherein said plurality of diffraction grating units is formed on a surface of said reflection member facing said light guide member.

16. The backlight module as claimed in claim 14, wherein said plurality of diffraction grating units is arranged parallel to a light incidence surface of said light guide member facing said light source.

17. The backlight module as claimed in claim 14, wherein diffraction grating units of said plurality of diffraction grating units are arranged in a denser way as said diffraction grating units of said plurality of diffraction grating units are located farther away from said light source.

18. A backlight module, comprising:

a light source;

a light guide member disposed next to said light source and having a light incidence surface facing said light source to receive light emitted therefrom, said light guide member further having a light emitting surface for emitting said light therefrom, said light incidence surface being substantially perpendicular to said light emitting surface; and a reflection member used to reflect said light and disposed next to a bottom surface of said light guide member opposite to said light emitting surface of said light guide member, said reflection member defining a plurality of diffraction grating units facing said light guide member to diffract said light.

19. The backlight module as claimed in claim 18, wherein diffraction grating units of said plurality of diffraction grating units are arranged in a denser way as said diffraction grating units of said plurality of diffraction grating units are located farther away from said light source.

20. The backlight module as claimed in claim 18, wherein each of said diffraction grating units is parallel to said light incidence surface.

* * * * *